(12) United States Patent
Huang et al.

(10) Patent No.: US 7,143,271 B2
(45) Date of Patent: Nov. 28, 2006

(54) AUTOMATIC REGISTER BACKUP/RESTORE SYSTEM AND METHOD

(75) Inventors: Ing-Jer Huang, Kaohsiung (TW); Yu-Wen Sung, Kaohsiung (TW)

(73) Assignee: National Sun Yat-Sen University, Taiwan (CN)

( * ) Notice: Subject to any disclaimer, the term of this patent is extended or adjusted under 35 U.S.C. 154(b) by 234 days.

(21) Appl. No.: 10/959,778

(22) Filed: Oct. 6, 2004

(65) Prior Publication Data
US 2005/0081021 A1    Apr. 14, 2005

(30) Foreign Application Priority Data
Oct. 9, 2003    (TW) .............................. 92128105 A (51) Int. Cl.
*G06F 12/00* (2006.01)
(52) U.S. Cl. ...................................... 712/229; 712/244
(58) Field of Classification Search ................ 710/260, 710/261, 262, 263, 264, 265, 266, 267, 268, 710/269; 712/43, 229, 244
See application file for complete search history.

(56) References Cited

U.S. PATENT DOCUMENTS

| | | | |
|---|---|---|---|
| 5,159,680 A | | 10/1992 | Joy et al. |
| 5,386,563 A | | 1/1995 | Thomas |
| 5,588,113 A | * | 12/1996 | Johnson ........................ 714/15 |
| 5,675,759 A | * | 10/1997 | Shebanow et al. .......... 712/217 |
| 5,701,436 A | * | 12/1997 | Nagashima et al. ........ 711/162 |
| 5,701,493 A | | 12/1997 | Jaggar |
| 5,793,944 A | * | 8/1998 | Luick ........................... 714/15 |
| 6,243,804 B1 | * | 6/2001 | Cheng ......................... 712/228 |
| 6,801,997 B1 | * | 10/2004 | Joy et al. ..................... 712/229 |
| 7,024,544 B1 | * | 4/2006 | Shelor ......................... 712/229 |
| 2004/0260910 A1 | * | 12/2004 | Watt et al. ..................... 712/43 |

FOREIGN PATENT DOCUMENTS

TW    494644    7/2002

* cited by examiner

*Primary Examiner*—William M. Treat
(74) *Attorney, Agent, or Firm*—Ladas & Parry (57) ABSTRACT

The invention relates to an automatic register backup/restore system. The system comprises: a general register file, a backup register file, at least one backup mode signal and at least one selector for selecting the general register file. The general register file comprises a plurality of general registers, and the backup register file comprises a plurality of backup registers. According to the system of the invention, upon exception, a backup mode is determined according to the cause of the exception. Then, according to the determined backup mode, the contents of at least one general register are automatically copied into at least one backup register. Upon leaving the exception process, according to the determined backup mode, the contents of the corresponding general registers are restored from the corresponding backup registers by using at least one selector. Therefore, the system of the invention can reduce the data moving activities between memory and registers during exception process. Because of the single operation mode of the system, the system does not need any selection-mode bit for selecting accessible registers due to different operation modes as used in the prior art. Therefore, the system of the invention can decrease the latency of accessing registers.

34 Claims, 8 Drawing Sheets

AUTOMATIC REGISTER BACKUP/RESTORE SYSTEM AND METHOD

BACKGROUND OF THE INVENTION

1. Field of the Invention

The present invention relates to an automatic register backup/restore system and method, more particularly, to an automatic register backup/restore system and method for a microprocessor.

2. Description of the Related Art

Conventional microprocessors have similar structure and method for handling an exception. When an exception occurs, the conventional microprocessor enters an operation mode to handle the exception. Before the subroutine of the exception is executed, the status information of the microprocessor must be stored. After the exception is completed, the stored status is restored such that the original program can resume its operation correctly as if the exception never happens.

Therefore, some registers are needed to store program counter value, and some registers are used for storing the status information of the microprocessor. In detail, some auxiliary registers, for example to store kind of the exception, are called as special-purposed register. Whatever kind of exception occurs, the contents of the register must be stored into memory before the subprogram of the exception is executed. And, before the subprogram of the exception is completed, the contents must be restored into the original register from memory so as to execute the original program. However, the extra instruction is needed to call the subprogram and to execute the exception procedure so as to achieve data movement between memory and the register. Some improved structure is developed to reduce data movement between memory and the register.

Referring to U.S. Pat. No. 5,159,680, entitled "RISC processing unit which selectively isolates register windows by indicating usage of adjacent register windows in status register," the patent relates to data processing apparatus and methods for enhancing the operation of a reduced instruction set computer system. The register windows are designed to utilize in Scalable Processor Architecture type microprocessor (SPARC), and enhance the efficiency of SPARC type microprocessor. Each window register group has a number of input registers, a similar number of output registers, and a number of local registers. The window register groups are physically arranged so the input registers of each group are the same physical registers as those of the next adjacent group to form one large ring or circular processor arrangement. This arrangement can obtain fast message transmission between the internal procedure. When switching the procedure, the contents of the register need not be stored into the memory in order to reduce data movement between register and memory. However, the register windows will increase the area of chip and the usage efficiency of the register windows is not good by considering various application environments.

Figure 1:
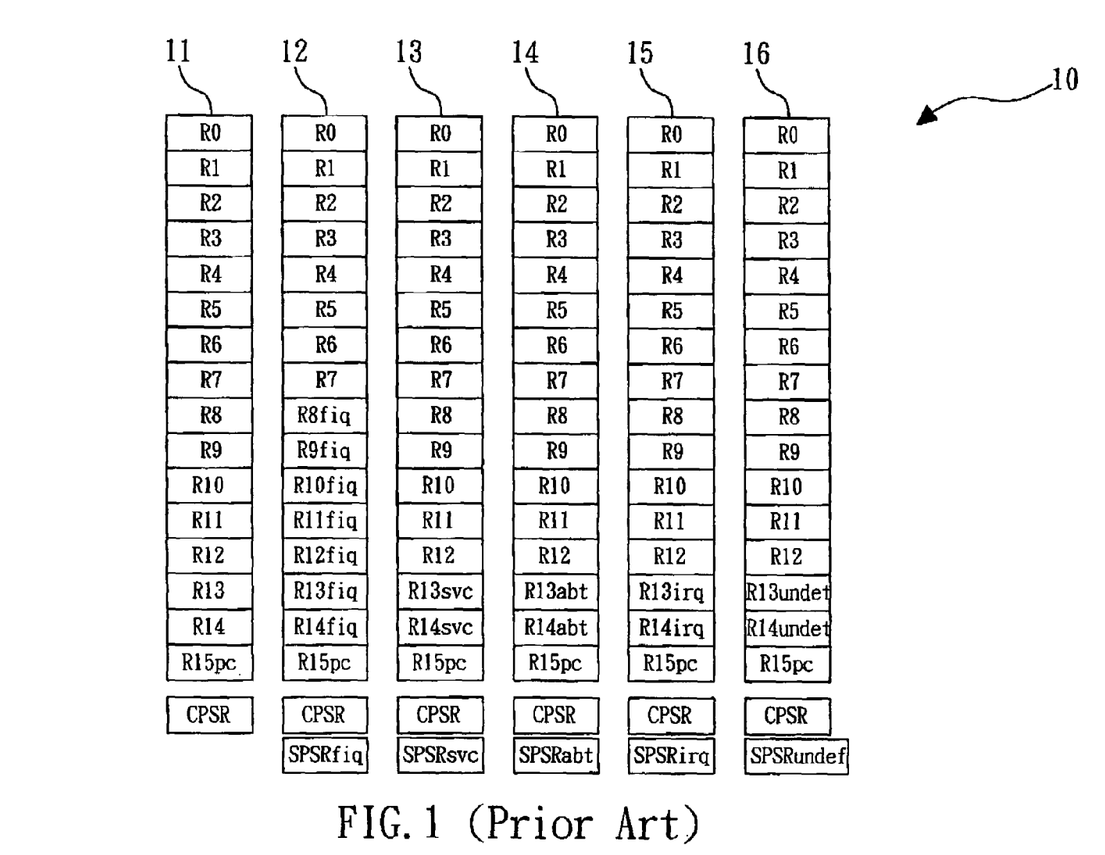
FIG. 1 illustrates the conventional register file arrangement.

U.S. Pat. No. 5,701,493, entitled "Exception handling method and apparatus in data processing systems," utilizes various operation modes to distinguish the type of various exceptions, not only an exception mode. Each operation mode controls different registers. If the processor accepts the exception, the processor switches to a corresponding operation mode according to the exception type. Referring to FIG. 1, a register file 10 comprises six registers 11, 12, 13, 14, 15 and 16, wherein the five bits of the register CPSR are used for determining six operation modes.

U.S. Pat. No. 5,386,563, entitled "Register substitution during exception processing," utilizes special banked registers belonging to special mode, while the other mode cannot access the special banked registers. The purpose of the patent is to fast switch the mode so as to reduce data movement between the memory and the register.

ROC Patent Application under Publication No. 494644, entitled "Method for selecting register," improves the banked registers of the U.S. Pat. No. 5,386,563. The six modes are transformed to two modes, as mode 0 and mode 1. The objective of the patent is to reduce the bits and time for selecting mode.

The conventional technique needs to switch the register windows or to switch the modes in order to select the register, and bits are necessary for controlling the switch. Besides, the access time for register will increase. Therefore, it is necessary to provide an innovative and progressive fuel cell so as to solve the above problem.

SUMMARY OF THE INVENTION

One objective of the present invention is to provide an automatic register backup/restore system comprising a general register file, a backup register file, a backup mode signal and at least one selector. The general register file comprises a plurality of general registers for storing data. The backup register file comprises a plurality of backup registers for storing data from the general registers. The backup register file has a plurality of backup modes, wherein each backup mode has at least one backup register. A storing connection between the backup registers and the general registers is determined by the backup mode. The backup mode signal is used for determining the backup mode of the backup register file according to a plurality of exceptions. The selector is used for restoring data from the backup registers to the corresponding general registers. A restoring connection between the backup registers and the general registers is determined by the backup mode.

Another objective of the present invention is to provide a method for processing data between backup registers and general registers. The method comprises the steps of: (a) determining a backup mode, according to an occurred exception; (b) storing data of at least one general register to at least one corresponding backup register according to the backup mode; and (c) restoring data of the corresponding backup register to the general register by at least one selector according to the backup mode after the occurred exception completes.

Therefore, according to the automatic register backup/restore system of the invention, when an exception occurs, the system can reduce data movement between registers and memory. Besides, because the system of the invention is one operation mode, the system of the invention does not need to select mode bits to determine available register in various operation modes as the conventional technique so as to reduce access time.

DETAILED DESCRIPTION OF THE INVENTION

Figure 2:
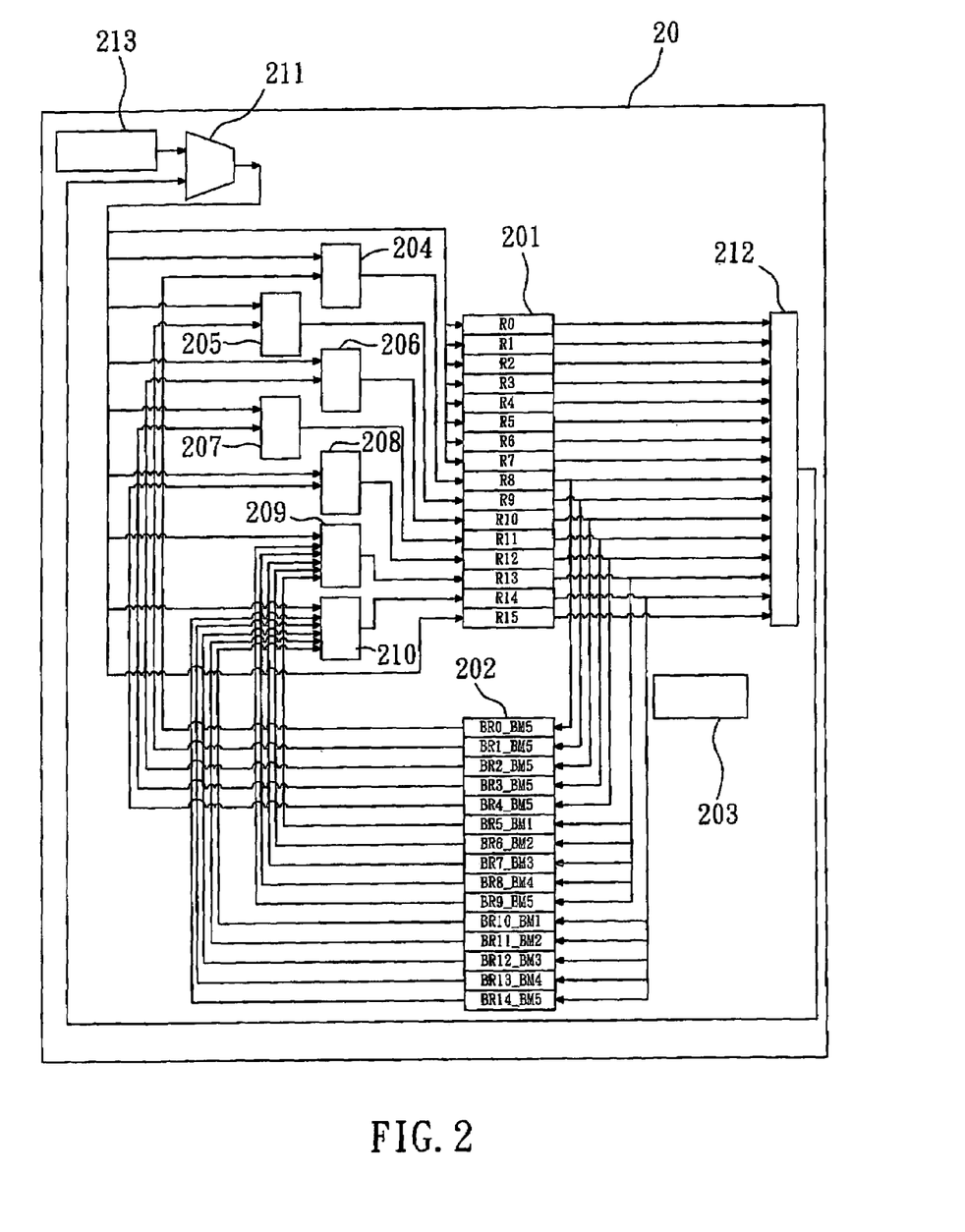
FIG. 2 illustrates a block diagram of an automatic register backup/restore system, according to a first embodiment of the invention.

Referring to FIG. 2, according to a first embodiment of the invention, an automatic register backup/restore system 20 comprises: a general register file 201, a backup register file 202, a backup mode signal 203, seven selectors 204 to 210, a multiplexer 211, a logic unit 212 and an external memory 213.

The general register file 201 comprises sixteen general registers R0 to R15 for storing data. In normal operation, the general register file 201 is used for storing data from the external memory 213 and by the selection of the multiplexer 211, and the data in the general register file 201 are transmitted to the logic unit 212. The multiplexer 211, the logic unit 212 and the external memory 213 are called an external device. The multiplexer 211 selects data from the logic unit 212 or the external memory 213 as inputs of the general registers in the general register file 201.

The backup register file 202 comprises fifteen backup registers (BR0_BM5, BR1_BM5, BR2_BM5, BR3_BM5, BR4_BM5, BR5_BM1, BR6_BM2, BR7_BM3, BR8_BM4, BR9_BM5, BR10_BM1, BR11_BM2, BR12_BM3, BR13_BM4 and BR14_BM5) for storing data from the general registers when an exception occurs. The backup register file 202 has five backup modes (BM1 to BM5), where each backup mode has at least one backup register, for example, a first backup mode (BM1) has two backup registers (BR5_BM1 and BR10_BM1), a second backup mode (BM2) has two backup registers (BR6_BM2 and BR11_BM2), a third backup mode (BM3) has two backup registers (BR7_BM3 and BR12_BM3), a fourth backup mode (BM4) has two backup registers (BR8_BM4 and BR13_BM4) and a fifth backup mode (BM5) has seven backup registers (BR0_BM5, BR1_BM5, BR2_BM5, BR3_BM5, BR4_BM5, BR9_BM5, and BR14_BM5).

The backup mode signal 203 is used for determining the backup mode of the backup register file 202 according to a plurality of exceptions. Because there are five backup modes in the first embodiment, the backup mode signal 203 must have three bits. If a designer defines five exceptions, for example: SVC, ABT, IRQ, UNDEF, and FIQ, the five backup modes are corresponding to the five exceptions. Each backup mode can define a special backup rule, and determine a storing connection between the backup registers and the general registers. That is, the backup mode defines that the data in the general register of the general register file must be stored to the corresponding backup register. For example, in the first backup mode, two backup registers BR5_BM1 and BR10_BM1 are connected to two general registers R13 and R14 of the general register file 201, respectively. Therefore, when an exception occurs, according to the corresponding backup mode, for example the first backup mode, the data in the two general registers R13 and R14 of the general register file 201 are stored to the two backup registers BR5_BM1 and BR10_BM1 of the backup register file 202, respectively.

The selectors 204 to 210 are used for restoring data from the backup registers to the corresponding general registers. A restoring connection between the backup registers and the general registers is determined by the backup mode. Each selector comprises at least two input ports and an output port, where one of the input ports is connected to the multiplexer of the external device, the other input port is connected to the corresponding backup register, and the output port is connected to the corresponding general register. For example, one of the input ports of a first selector 204 is connected to the multiplexer 211, the other input port is connected to the corresponding backup register BR0_BM5, and the output port is connected to the corresponding general register R8. One of the input ports of a seven selector 210 is connected to the multiplexer 211, the other input ports are connected to the corresponding backup register BR1_BM1, BR11_BM2, BR12_BM3, BR13_BM4 and BR14_BM5, and the output port is connected to the corresponding general register R14. Therefore, the selector can control the input of the general register connecting to the general register or the multiplexer.

When the occurred exception completes, according to the backup mode, for example, in the first backup mode, the data in the backup registers BR5_BM1 and BR1_BM1 of the backup register file 202 are restored to the general registers R13 and R14 of the general register file 201 by the sixth selector 209 and the seventh selector 210 so as to execute the original program before the exception occurred.

Figure 3:
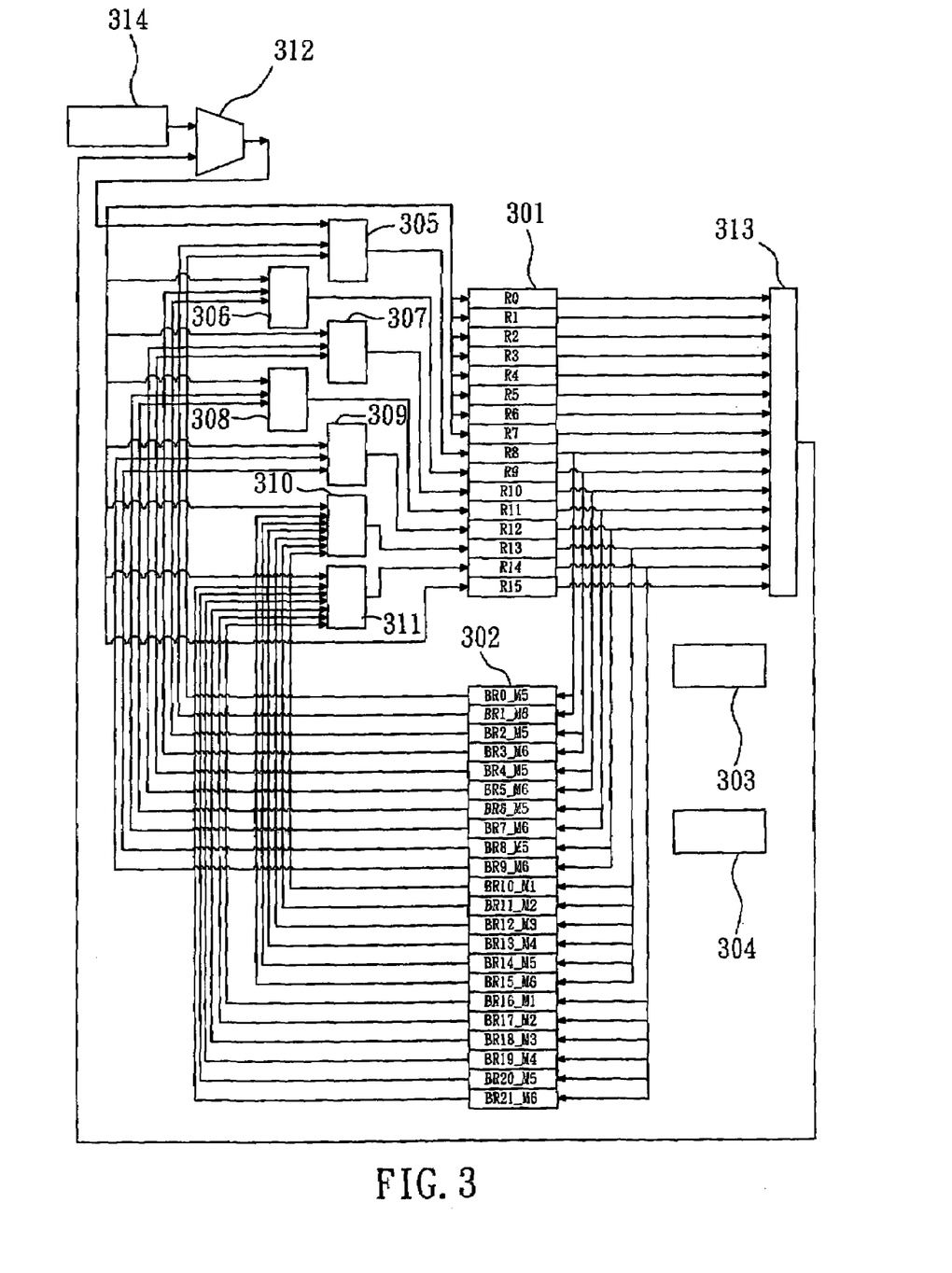
FIG. 3 illustrates a block diagram of an automatic register backup/restore system, according to a second embodiment of the invention.

Referring to FIG. 3, according to a second embodiment of the invention, an automatic register backup/restore system 30 comprises: a general register file 301, a backup register file 302, a backup mode signal 303, a restore mode signal 304, seven selectors 305 to 311, a multiplexer 312, a logic unit 313 and an external memory 314.

The general register file 301 comprises sixteen general registers R0 to R15 for storing data. In normal operation, the general register file 301 is used for storing data from the external memory 314 and by the selection of the multiplexer 312, and the data in the general register file 301 are transmitted to the logic unit 313. The multiplexer 312, the logic unit 313 and the external memory 314 are called as an external device. The multiplexer 312 selects data from the logic unit 313 or the external memory 314 as inputs of the general registers in the general register file 301.

The backup register file 302 comprises twenty-two backup registers (BR0_M5, BR1_M6, BR2_M5, BR3_M6, BR4_M5, BR5_M6, BR6_M5, BR7_M6, BR8_M5, BR9_M6, BR10_M1, BR11_M2, BR12_M3, BR13_M4, BR14_M5, BR15_M6, BR16_M1, BR17_M2, BR18_M3, BR19_M4, BR20_M5 and BR21_M6) for storing data from the general registers when an exception occurs. The backup register file 302 has six modes (M1 to M6), wherein each mode has a backup mode and a restore mode, each mode has at least one backup register, for example, a first mode (M1, having a first backup mode and a first restore mode) has two backup registers (BR10_M1 and BR16_M1), a second mode (M2, having a second backup mode and a second restore mode) has two backup registers (BR11_M2 and BR17_M2), a third mode (M3, having a third backup mode and a third restore mode) has two backup registers (BR12_M3 and BR18_M3), a fourth mode (M4, having a fourth backup mode and a fourth restore mode) has two backup registers (BR13_M4 and BR19_M4), a fifth mode (M5, having a fifth backup mode and a fifth restore mode) has seven backup registers (BR0_M5, BR2_M5, BR4_M5, BR6_M5, BR8_M5, BR14_M5, and BR20_M5) and a sixth mode (M6, having a sixth backup mode and a sixth restore mode) has seven backup registers (BR1_M6, BR3_M6, BR5_M6, BR7_M6, BR9_M6, BR15_M6 and BR21_M6).

The backup mode signal 303 is used for determining the backup mode of the backup register file 302 according to a plurality of exceptions. The restore mode signal 304 is used for determining the restore mode of the backup register file 302 according to a plurality of exceptions. If a designer defines five exceptions, for example: SVC, ABT, IRQ, UNDEF, and FIQ, the backup register file 302 has six modes (the five exceptions and one common mode), and each mode has a backup mode and a restore mode. Each backup mode or restore mode can define a special backup rule and restore rule. The backup mode defines that the data in the general register of the general register file must be stored to the corresponding backup register. For example, in the first backup mode, two backup registers BR10_M1 and BR16_M1 are connected to two general registers R13 and R14 of the general register file 301 respectively.

The selectors 305 to 311 are used for restoring data from the backup registers to the corresponding general registers. The restore mode defines that the data in the backup register of the backup register file 302 must be restored to the corresponding general register of the general register file 301. Each selector comprises at least three input ports and an output port, where one of the input ports is connected to the multiplexer of the external device, the other two input ports are connected to the corresponding backup registers, and the output port is connected to the corresponding general register. For example, a first port of the input ports of a first selector 305 is connected to the multiplexer 312, a second port of the input port is connected to the backup register BR0_M5, the other input port is connected to the backup register BR1_M6, and the output port is connected to the corresponding general register R8. One of the input ports of a seven selector 311 is connected to the multiplexer 312, the other input ports are connected to the corresponding backup register BR16_M1, BR17_M2, BR18_M3, BR19_M4, BR20_BM5 and BR21_M6, and the output port is connected to the corresponding general register R14. Therefore, the selector can control the input of the general register connecting to the general register or the multiplexer.

The method for processing data between backup registers and general registers of the system 30 according to the second embodiment is different from that of the system 20 according to the first embodiment. The system 30 has the backup mode signal and the restore mode signal, and whenever an exception occurs or the exception completes and returns, the store action and the restore action must be executed according to the corresponding backup mode and restore mode. That is, when an exception occurs, the store action and the restore action must be executed according to the corresponding backup mode and restore mode. And, when the exception completes and returns, the store action and the restore action must be executed according to the corresponding backup mode and restore mode.

According to the first embodiment, when an exception occurs, the data is stored. When the exception completes and returns, the data is restored. The data stored is independent from the data restored. According to the second embodiment, when an exception occurs, the data is stored and is then restored. When the exception completes and returns, the data is restored and is restored. The data is stored and restored at the same time.

Figure 4:
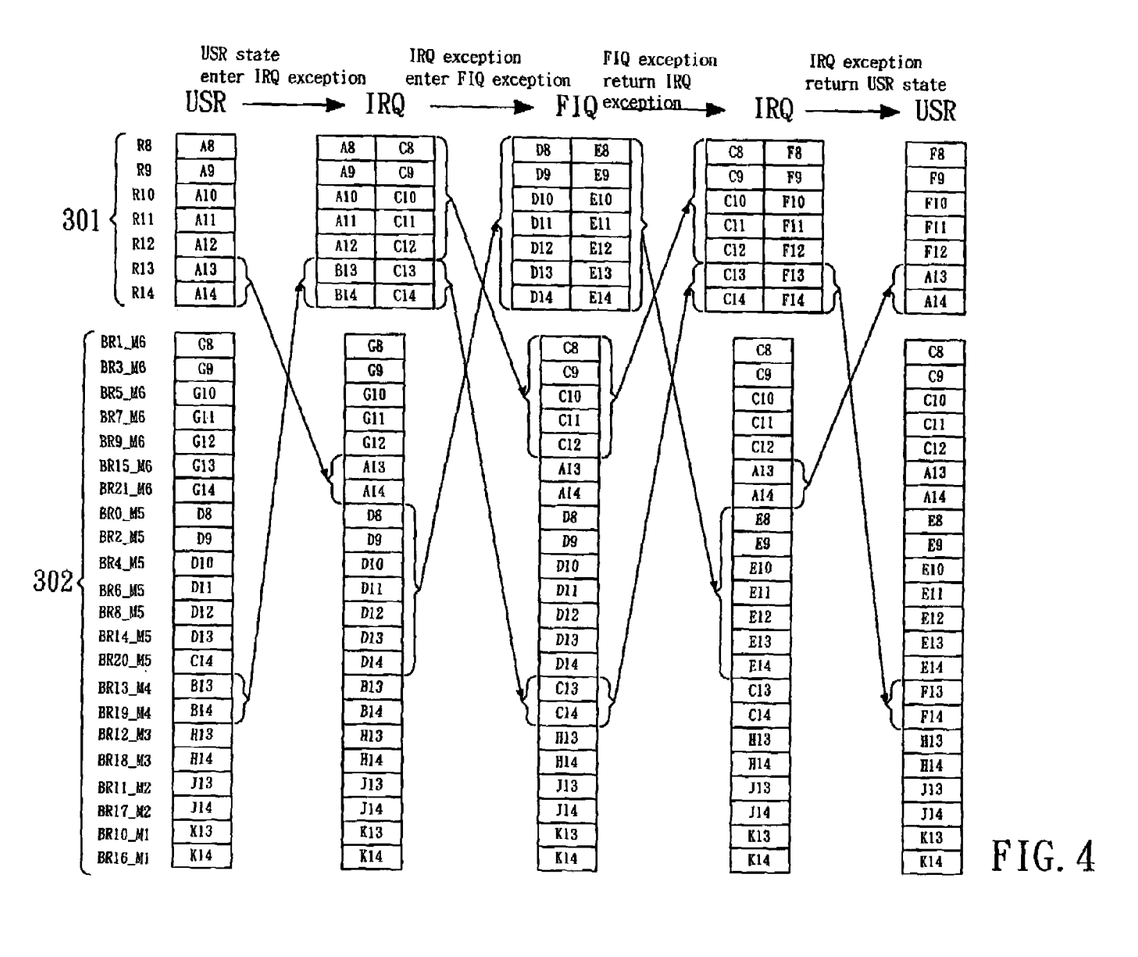
FIG. 4 illustrates that the automatic register backup/restore system handles a plurality of exception, according to the second embodiment of the invention.

Referring to FIG. 4, an example illustrates the operation of the system 30 according to the second embodiment. When an IRQ exception (defines as a fourth mode M4 in the second embodiment) occurs at the USR state, the data A13 and A14 in the general registers R13 and R14 of the general register file 301 are stored to the backup registers BR15_M6 and BR21_M6 according to the state (USR) occurring the exception and the backup mode (the sixth backup mode); and the data B13 and B14 in the backup registers BR13_M4 and BR19_M4 are restored to the general registers R13 and R14 of the general register file 301 according to the state (USR) occurring the exception and the restore mode (the fourth restore mode).

When an FIQ exception (defines as a fifth mode M5 in the second embodiment) occurs during the processing IRQ exception, the data C8 to C12 in the general registers R8 to R12 of the general register file 301 are stored to the backup registers BR1_M6, BR3_M6, BR5_M6, BR7_M6 and BR9_M6, and the data C13 and C14 in the general registers R13 and R14 of the general register file 301 are stored to the backup registers BR13_M4 and BR19_M4 according to state (IRQ exception) occurring the FIQ exception and the backup mode (the fourth backup mode); and the data D8 to D14 in the backup registers BR0_M5, BR2_M5, BR4_M5, BR6_M5, BR8_M5, BR14_M5 and BR20_M5 are restored to the general registers R8 to R14 of the general register file 301 according to the state (IRQ) rendering the exception and the restore mode (the fifth restore mode).

After the FIQ exception completes, the data E8 to E14 in the general registers R8 to R14 of the general register file 301 are stored to the backup registers BR0_M5, BR2_M5, BR4_M5, BR6_M5, BR8_M5, BR14_M5, and BR20_M5 according to the state (FIQ) returning the exception and the backup mode (the fifth backup mode); and the data C8 to C12 in the backup registers BR1_M6, BR3_M6, BR5_M6, BR7_M6, and BR9_M6, are restored to the general registers R8 to R12 of the general register file 301, and the data C13 and C14 in the backup registers BR13_M4 and BR19_M4 are restored to the general registers R13 and R14 of the general register file 301 according to the state (FIQ) returning the exception and the restore mode (the fourth restore mode). Therefore, the system can store the data C8 to C14 in the IRQ exception when the FIQ exception occurs, and the data C8 to C14 are restored in order to continuously execute the IRQ exception after the FIQ exception completes.

After the IRQ exception completes, the data F13 and F14 in the general registers R13 and R14 of the general register file 301 are stored to the backup registers BR13_M4 and BR19_M4 according to the state (IRQ) returning the exception and the backup mode (the sixth backup mode); and the data A13 and A14 in the backup registers BR15_M6 and BR21_M6 are restored to the general registers R13 and R14 of the general register file 301 according to the state (IRQ) returning the exception and the restore mode (the sixth restore mode). Therefore, the system can store the data A13 and A14 in the USR state when the IRQ exception occurs, and the data A13 and A14 are restored in order to continuously execute the USR state after the IRQ exception completes.

Figure 5A:
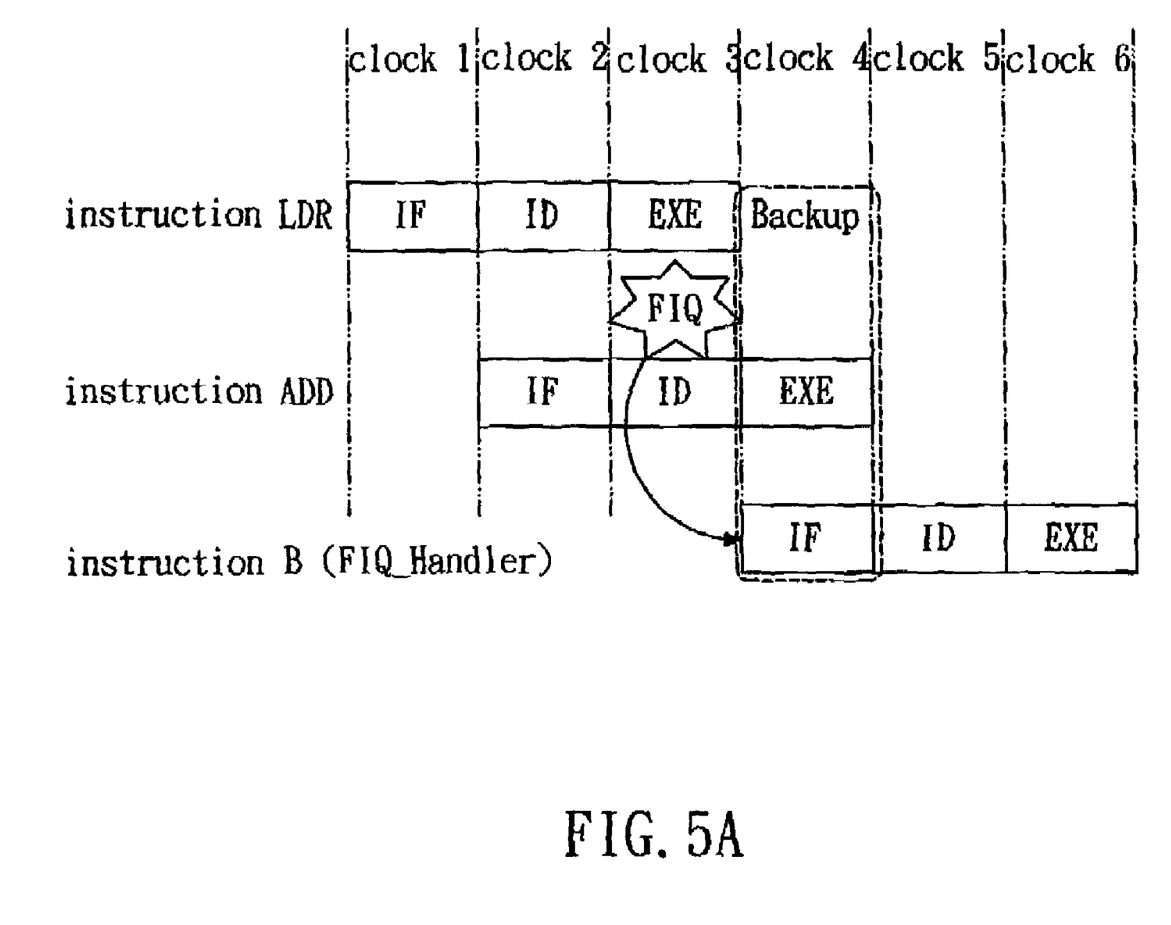
FIG. 5A illustrates that the time of storing data is the same as the time of an instruction fetch stage of a next instruction after the exception occurred, according to the invention.
Figure 5B:
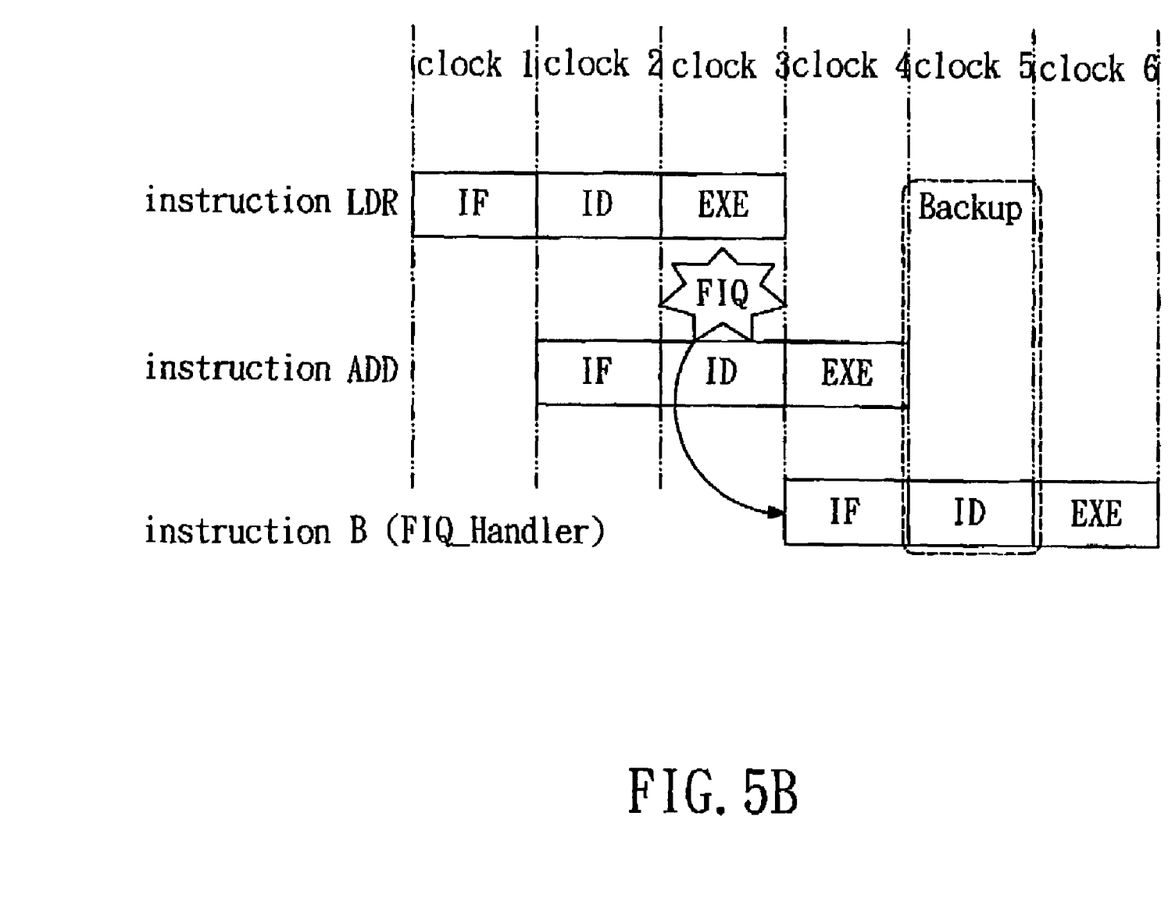
FIG. 5B illustrates that the time of storing data is the same as the time of an instruction decode stage of a next instruction after the exception occurred, according to the invention.
Figure 5C:
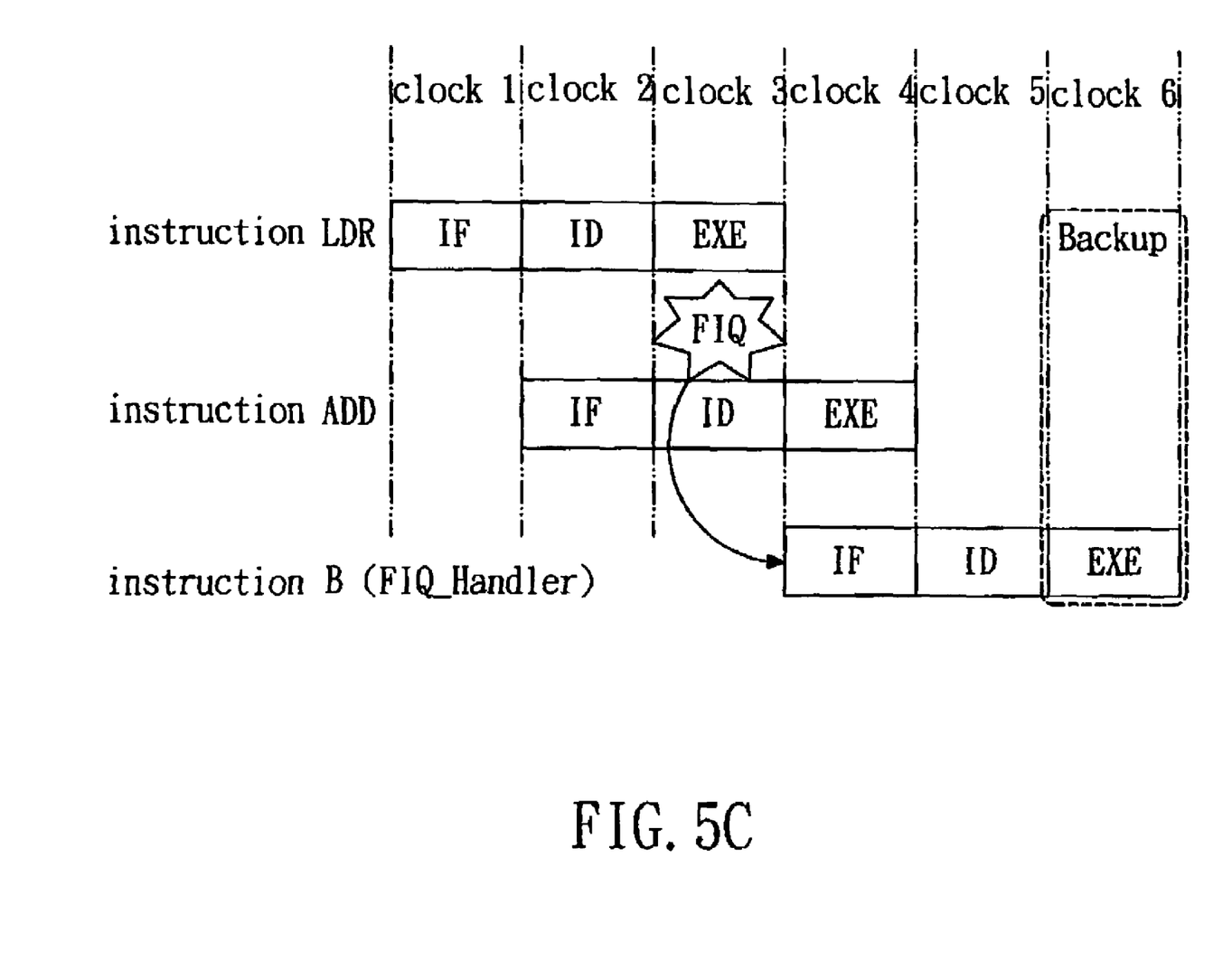
FIG. 5C illustrates that the time of storing data is the same as the time of an instruction execution stage of a next instruction after the exception occurred, according to the invention.

Referring to FIGS. 5A to 5C, they illustrates the timing during the exception occurring in a microprocessor according to the first and second embodiments of the invention. FIGS. 5A to 5C only illustrate the timing for executing store action, and do not show the timing for executing restore action. In the FIGS. 5A to 5C, clock 1 and clock 2 respectively represent the first clock and the second clock. In the embodiment, each instruction is designed to have three states: an instruction fetch state (IF), an instruction decode state (ID) and instruction execution state (EXE).

As shown in FIG. 5A, the first instruction of the main program is LDR instruction, and the second instruction is ADD instruction, instruction B is the next instruction after an FIQ exception occurs. FIQ_Handler is an address. At the first clock (clock 1) the IF (instruction fetch state) of the first instruction LDR is executed. At the second clock (clock 2), the ID (instruction decode state) of the first instruction LDR is executed, and the IF (instruction fetch state) of the second instruction ADD is executed at the same time. At the third clock (clock 3), the EXE (instruction execution state) of the first instruction LDR is executed, and the ID (instruction decode state) of the second instruction ADD is executed at the same time. If an FIQ exception occurs at the third clock, the program will execute the instruction B.

At the fourth clock (clock 4), the content of the general register is stored to the backup register according to the backup mode of the FIQ exception. At the same time of the fourth clock (clock 4), the IF (instruction fetch state) of the instruction B is executed. That is, the time of storing data (Backup) is the same as the time of the instruction fetch stage of the next instruction after the occurred exception. Therefore, the microprocessor does not spend extra time to execute the storing data.

Referring to FIG. 5B, the time of storing data (Backup) is the same as the time of the instruction decode stage (ID) of the next instruction after the occurred exception. The data is stored at the fifth clock (clock 5) and the time delays one clock compared with FIG. 5A. The time of storing data (Backup) is the same as the time of the instruction decode stage (ID) of the instruction B. At clock 5, the data in the general register can exactly be stored, and the microprocessor does not spend extra time to execute the storing data.

Referring to FIG. 5C, the time of storing data (Backup) is the same as the time of the instruction execution stage (EXE) of the next instruction after the occurred exception. The data is stored at the sixth clock (clock 6) and the time delays two clocks compared with FIG. 5A. The time of storing data (Backup) is the same as the time of the instruction execution stage (EXE) of the instruction B. At clock 6, the data in the general register can be exactly stored, and the microprocessor does not spend extra time to execute the storing data.

Given the above, the time of storing data can be the same as the time of the instruction fetch stage (IF), the instruction decode stage (ID) or the instruction execution stage (EXE) of the next instruction after the exception. Similarly, the time of restoring data can be the same as the time of the instruction fetch stage (IF), the instruction decode stage (ID) or the instruction execution stage (EXE) of the next instruction after the exception completes and returns. Therefore, whatever storing data or the restoring data is executed, the microprocessor does not spend extra time to execute the storing data or the restoring data.

Figure 6:
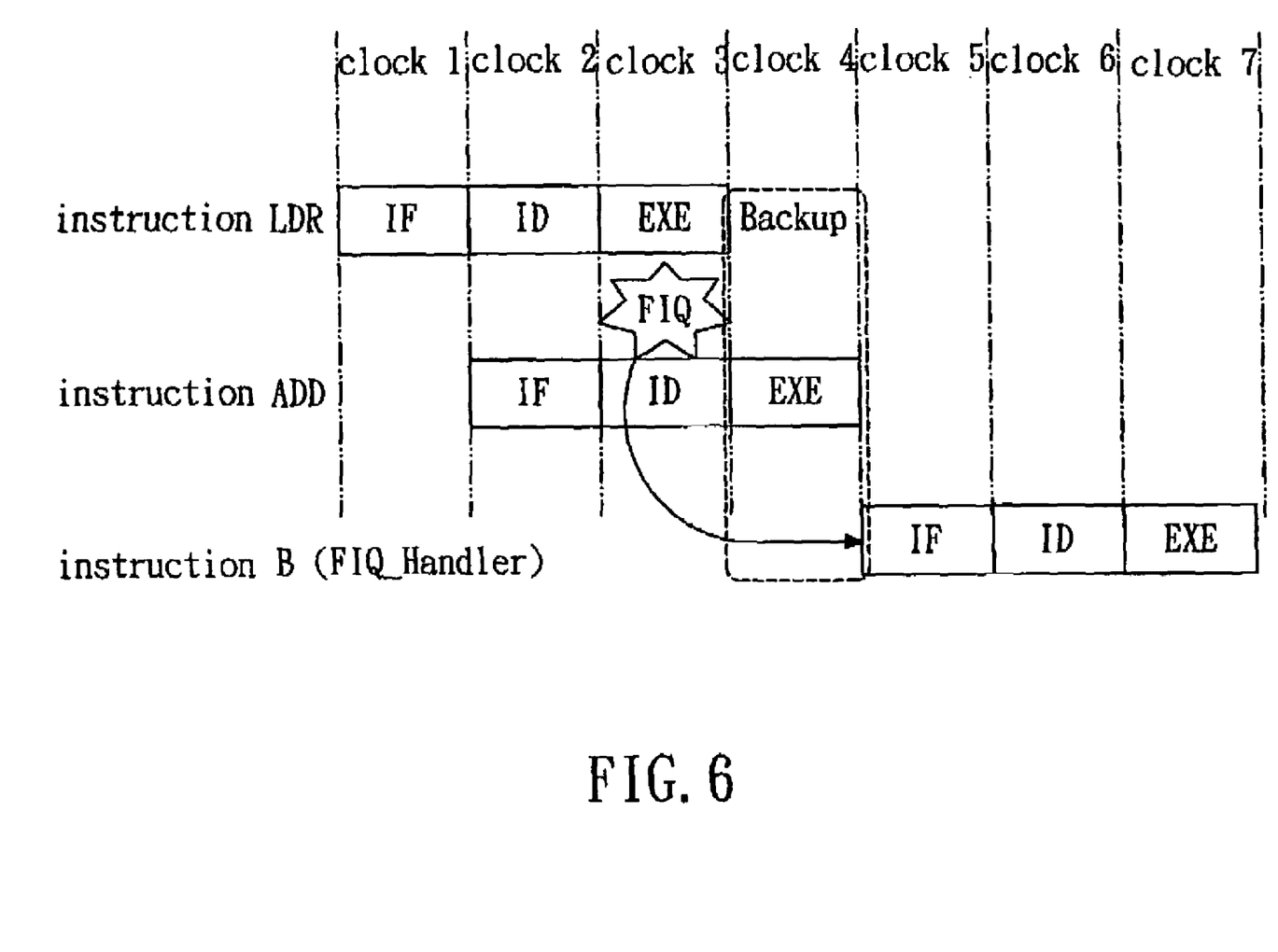
FIG. 6 illustrates that the time of storing data is before the time of executing a next instruction after the exception occurred, according to the invention.

However, the time of storing data does not need to be the same as the time of the instruction fetch stage (IF), the instruction decode stage (ID) or the instruction execution stage (EXE) of the next instruction after the occurred exception. That is, the time of storing data can be before the time of executing a next instruction after the exception occurred. As shown in FIG. 6, the time of storing data (Backup) is at clock 4, and is before the time (clock 5) of executing the instruction fetch stage (IF) of the next instruction after the exception occurred. Similarly, the time of restoring data can be before the time of executing a next instruction after the exception occurred.

Therefore, according to the automatic register backup/restore system of the invention, when an exception occurs, the system can reduce data movement between registers and memory. Besides, because the system of the invention is one operation mode, the system of the invention does not need select mode bits to determine available register in various operation modes as the conventional technique so as to reduce access time. Furthermore, compared with the conventional register windows and the banked register, the system of the invention can decrease the area of chip and the access time.

While an embodiment of the present invention has been illustrated and described, various modifications and improvements can be made by those skilled in the art. The embodiment of the present invention is therefore described in an illustrative, but not restrictive, sense. It is intended that the present invention may not be limited to the particular forms as illustrated, and that all modifications which maintain the spirit and scope of the present invention are within the scope as defined in the appended claims.

What is claimed is:

1. An automatic register backup/restore system, comprising:
    a general register file, having a plurality of general registers for storing data;
    a backup register file, having a plurality of backup registers for storing data from the general registers, the backup register file having a plurality of backup modes, each backup mode having at least one backup register, a storing connection between the backup registers and the general registers determined by the backup mode;
    a backup mode signal, for determining the backup mode of the backup register file according to a plurality of exceptions; and
    at least one selector, for restoring data from the backup registers to the corresponding general registers, a restoring connection between the backup registers and the general registers determined by the backup mode.

2. The system according to claim 1, wherein the general register file comprises sixteen general registers, and the backup register file comprises fifteen backup registers.

3. The system according to claim 1, wherein the general registers and the backup registers are 32-bit.

4. The system according to claim 1, wherein the selector comprises at least two input ports and an output port, one of the input ports is connected to an external device, the other input port is connected to the corresponding backup register, the output port is connected to the corresponding general register.

5. The system according to claim 4, wherein the external device comprises a multiplex, a logic unit and an external memory.

6. The system according to claim 1, further comprising a restore mode signal for determining a restore mode according to a plurality of exceptions, the restore mode for controlling the selector to restore data from the backup registers to the corresponding general registers.

7. The system according to claim 6, wherein the general register file comprises sixteen general registers, and the backup register file comprises twenty-two backup registers.

8. The system according to claim 6, wherein the general registers and the backup registers are 32-bit.

9. The system according to claim 6, wherein the selector comprises at least two input ports and an output port, one of the input ports is connected to an external device, the other input port is connected to the corresponding backup register, and the output port is connected to the corresponding general register.

10. The system according to claim 9, wherein the external device comprises a multiplex, a logic unit and an external memory.

11. A method for processing data between backup registers and general registers, comprising the steps of:
 (a) determining a backup mode, according to an occurred exception;
 (b) storing data of at least one general register to at least one corresponding backup register according to the backup mode; and
 (c) restoring data of the corresponding backup register to the general register by at least one selector according to the backup mode after the exception completes.

12. The method according to claim 11, further comprising a step of determining a storing connection between the backup registers and the general registers according to the backup mode.

13. The method according to claim 11, further comprising a step of determining a restoring connection between the selector with the backup registers and the general registers according to the backup mode.

14. The method according to claim 11, wherein in step (b), the method is used to process the exception occurred in a microprocessor, and the time of storing data is before the time of executing a next instruction after the exception occurred.

15. The method according to claim 11, wherein in step (c), the method is used to process the exception occurred in a microprocessor, and the time of restoring data is before the time of executing a next instruction after the exception completes.

16. The method according to claim 11, wherein in step (b), the method is used to process the exception occurred in a microprocessor, and the time of storing data is the same as the time of executing a next instruction after the exception occurred.

17. The method according to claim 16, wherein the time of storing data is the same as the time of an instruction fetch stage of the next instruction after the exception occurred.

18. The method according to claim 16, wherein the time of storing data is the same as the time of an instruction decode stage of the next instruction after the exception occurred.

19. The method according to claim 16, wherein the time of storing data is the same as the time of an instruction execution stage of the next instruction after the exception occurred.

20. The method according to claim 11, wherein in step (c), the method is used to process the exception occurred in a microprocessor, and the time of restoring data is the same as the time of executing a next instruction after the exception completes.

21. The method according to claim 20, wherein the time of restoring data is the same as the time of an instruction fetch stage of the next instruction after the exception completes.

22. The method according to claim 20, wherein the time of restoring data is the same as the time of an instruction decode stage of the next instruction after the exception completes.

23. The method according to claim 20, wherein the time of restoring data is the same as the time of an instruction execution stage of the next instruction after the exception completes.

24. A method for processing data between backup registers and general registers, comprising the steps of:
 (a) determining a backup mode of exception occurred and a restore mode of exception occurred, according to an exception occurred;
 (b) storing data of at least one general register to at least one corresponding backup register according to the backup mode of exception occurred, and restoring data of at least one backup register to at least one corresponding general register by at least one selector according to the restore mode of exception occurred;
 (c) determining a backup mode of return exception and a restore mode of return exception, according to the exception occurred after the exception occurred completes; and
 (d) storing data of at least one general register to at least one corresponding backup register according to the backup mode of return exception, and restoring data of at least one backup register to at least one corresponding general register by at least one selector according to the restore mode of return exception.

25. The method according to claim 24, wherein the method is used to process the exception occurred in a microprocessor, in step (b), the time of storing data and restoring data is before the time of executing a next instruction after the exception occurred.

26. The method according to claim 24, wherein the method is used to process the exception occurred in a microprocessor, in step (d), the time of storing data and restoring data is before the time of executing a next instruction after the exception completes.

27. The method according to claim 24, wherein the method is used to process the exception occurred in a microprocessor, in step (b), the time of storing data and restoring data is the same as the time of executing a next instruction after the exception occurred.

28. The method according to claim 27, wherein the time of storing data and restoring data is the same as the time of an instruction fetch stage of the next instruction after the exception occurred.

29. The method according to claim 27, wherein the time of storing data and restoring data is the same as the time of an instruction decode stage of the next instruction after the exception occurred.

30. The method according to claim 27, wherein the time of storing data and restoring data is the same as the time of an instruction execution stage of the next instruction after the exception occurred.

31. The method according to claim 24, wherein the method is used to process the exception occurred in a microprocessor, in step (d), the time of storing data and restoring data is the same as the time of executing a next instruction after the exception completes.

32. The method according to claim 31, wherein the time of storing data and restoring data is the same as the time of an instruction fetch stage of the next instruction after the exception completes.

33. The method according to claim 31, wherein the time of storing data and restoring data is the same as the time of an instruction decode stage of the next instruction after the exception completes.

34. The method according to claim 31, wherein the time of storing data and restoring data is the same as the time of an instruction execution stage of the next instruction after the exception completes.

* * * * *

UNITED STATES PATENT AND TRADEMARK OFFICE
CERTIFICATE OF CORRECTION

PATENT NO. : 7,143,271 B2 Page 1 of 1
APPLICATION NO. : 10/959778
DATED : November 28, 2006
INVENTOR(S) : Ing-Jer Huang et al.

It is certified that error appears in the above-identified patent and that said Letters Patent is hereby corrected as shown below:

Title page, item 73, "Taiwan (CN)" should read -- Kaohsiung (TW) --.

Signed and Sealed this

Thirtieth Day of October, 2007

JON W. DUDAS
*Director of the United States Patent and Trademark Office*